(12) United States Patent
Ai et al.

(10) Patent No.: US 11,602,001 B2
(45) Date of Patent: Mar. 7, 2023

(54) METHOD AND DEVICE FOR RESUMING DATA RADIO BEARER, STORAGE MEDIUM AND ELECTRONIC DEVICE

(71) Applicant: ZTE Corporation, Shenzhen (CN)

(72) Inventors: Jianxun Ai, Shenzhen (CN); He Huang, Shenzhen (CN); Xiaojuan Shi, Shenzhen (CN); Zijiang Ma, Shenzhen (CN); Qian Dai, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/265,588

(22) PCT Filed: Aug. 9, 2019

(86) PCT No.: PCT/CN2019/099977
§ 371 (c)(1),
(2) Date: Feb. 3, 2021

(87) PCT Pub. No.: WO2020/030110
PCT Pub. Date: Feb. 13, 2020

(65) Prior Publication Data
US 2021/0168893 A1   Jun. 3, 2021

(30) Foreign Application Priority Data
Aug. 9, 2018 (CN) .......................... 201810904576.9

(51) Int. Cl.
*H04W 76/00* (2018.01)
*H04W 76/19* (2018.01)
(Continued)

(52) U.S. Cl.
CPC ....... *H04W 76/19* (2018.02); *H04W 28/0268* (2013.01); *H04W 76/11* (2018.02); *H04W 76/27* (2018.02); *H04W 80/02* (2013.01)

(58) Field of Classification Search
CPC . H04W 76/19; H04W 28/0268; H04W 76/11; H04W 76/27; H04W 80/02; H04W 28/0252; H04W 28/0278; H04W 76/15
See application file for complete search history.

(56) References Cited

U.S. PATENT DOCUMENTS

2017/0331670 A1   11/2017   Parkvall
2020/0008255 A1*   1/2020   Sharma ............... H04W 12/037
2020/0113012 A1*   4/2020   Lee ................... H04W 74/0833

FOREIGN PATENT DOCUMENTS

CN   107666692 A   2/2018
WO   2015030483 A1   3/2015

OTHER PUBLICATIONS

Ericsson810 (Addition of RRC suspend resume for SCell in euCA, R2-1808810, May 2018).*
(Continued)

*Primary Examiner* — Lakeram Jangbahadur
(74) *Attorney, Agent, or Firm* — Cantor Colburn LLP

(57) ABSTRACT

Provided are a method and device for resuming data radio bearer, a storage medium and an electronic device. The method for resuming data radio bearer includes: indication information is sent to a network-side network element, the indication information being used for indicating a first data radio bearer in data radio bearers maintained by User Equipment (UE), and the first data radio bearer being a data radio bearer needing to send uplink data; configuration information returned by the network-side network element according to the indication information is received; and the first data radio bearer is resumed according to the configuration information.

13 Claims, 3 Drawing Sheets

(51) Int. Cl.
　　　*H04W 76/11*　　　(2018.01)
　　　*H04W 76/27*　　　(2018.01)
　　　*H04W 28/02*　　　(2009.01)
　　　*H04W 80/02*　　　(2009.01)

(56) References Cited

OTHER PUBLICATIONS

Ericsson251 (Secondary Node Resume in NE-DC and NN-DC, R2-181251,(TP to 38.300), Jul. 2018).*
International Search Report for corresponding application PCT/CN2019/099977 filed Aug. 9, 2019; dated Oct. 30, 2019.
LG Electronics Inc, "Further consideration on handling of SCG configuration for Inactive", 3GPP TSG-RAN WG2 AH Meeting Montreal, Canada, Jul. 2-Jul. 6, 2018, R2-1810659.
Ericsson. "Secondary Node Resume in NE-DC and NN-DC (TP to 38.300)", 3GPP TSG-RAN WG2#AH1807, Montreal, Canada, Jul. 2-6, 2018, R2-1810251.
3GPP TSG RAN meeting #80, La Jolla USA Jun. 11-14, 2018, RP-181279.
3GPP TSG-WG2 Meeting #102, Busan, Republic of Korea, May 21-15, 2018, R2-1808810.
CATT, "Direct CA or DC Activation and Deactivation", 3GPP TSG-RAN WG2 Meeting #106, Reno USA, May 13-17, 2019; R2-1905880.
Ericsson, "RRC Suspended and CA establishment", 3GPP TSG-RAN WG2 #101bis, Sanya PR of China, Apr. 16-20, 2018; R2-1805829.
European Search Report for corresponding application EP19846050; dated Aug. 12, 2021.
ZTE Corporation, "On Directly Configuring SCell as Activated", 3GPP TSG-RAN WG2 Meeting #106, Reno USA, May 13-17, 2019; R2-1907096.

* cited by examiner

METHOD AND DEVICE FOR RESUMING DATA RADIO BEARER, STORAGE MEDIUM AND ELECTRONIC DEVICE

CROSS-REFERENCE TO RELATED APPLICATIONS

The present disclosure claims priority to Chinese Patent Application No. 201810904576.9 filed to the China National Intellectual Property Administration on Aug. 9, 2018, the disclosure of which is hereby incorporated by reference in its entirety.

TECHNICAL FIELD

The present disclosure relates to the field of communications, in particular to a method and device for resuming a data radio bearer, a storage medium and an electronic device.

BACKGROUND

In the 3rd Generation Partnership Project (3GPP) system, a new Radio Resource Control (RRC) state is introduced. That is, an RRC_INACTIVE state. User Equipment (UE) may be resumed from the RRC_INACTIVE state to an RRC connected state through an RRC connection resume process. It is stipulated in the related art that after the UE in an inactive state receives the message MSG4 in the RRC connection resume process, all data radio carriers configured by the UE are resumed.

At the same time, in the 3GPP access network technology, there is also a Dual Connection (DC) mode. In the DC mode, the UE simultaneously establishes the data radio bearers with two different network-side network elements. One of the two different network-side network elements is called a Master Node (MN) of the UE, and the other is called a Secondary Node (SN).

In a related art, a method for resuming a data radio bearer used by the UE in the RRC connection resume process does not consider the problem that for the UE configured with DC, how to resume the data radio bearer configured for the corresponding connection in the RRC connection resume process. At the same time, in the related art, the UE uses the method of resuming all the data radio bearers configured by the UE in the RRC connection resume process, so the RRC connection resume process cannot be optimized in a new radio access network structure.

In the related art, no solution has been proposed for the problem of how to selectively resume a part of the required data radio bearers in the process of resuming data radio bearers.

SUMMARY

Embodiments of the disclosure provide a method and device for resuming a data radio bearer, a storage medium and an electronic device to at least solve the problem in the related art of how to selectively resume a part of the required data radio bearers in the process of resuming data radio bearers.

According to an embodiment of the application, a method for resuming a data radio bearer is provided, and the method includes: indication information is sent to a network-side network element, the indication information being used for indicating a first data radio bearer in data radio bearers maintained by UE, and the first data radio bearer being a data radio bearer needing to send uplink data; configuration information returned by the network-side network element according to the indication information is received; and the first data radio bearer is resumed according to the configuration information.

According to another embodiment of the application, a method for resuming a data radio bearer is provided, and the method includes: indication information sent by the UE is received, the indication information being used for indicating the first data radio bearer in the data radio bearers maintained by the UE, and the first data radio bearer being a data radio bearer needing to send the uplink data; and configuration information is returned to the UE according to the indication information, the configuration information being used for instructing the UE to resume the first data radio bearer according to the configuration information.

According to another embodiment of the application, a device for resuming a data radio bearer is provided, and the device includes: an indicating module, configured to send indication information to the network-side network element, the indication information being used for indicating the first data radio bearer in the data radio bearers maintained by the UE, and the first data radio bearer being a data radio bearer needing to send the uplink data; a receiving module, configured to receive the configuration information returned by the network-side network element according to the indication information; and a resuming module, configured to resume the first data radio bearer according to the configuration information.

According to another embodiment of the application, a device for resuming a data radio bearer is provided, and the device includes: an obtaining module, configured to receive indication information sent by the UE, the indication information being used for indicating the first data radio bearer in the data radio bearers maintained by the UE, and the first data radio bearer being a data radio bearer needing to send the uplink data; and a configuring module, configured to return configuration information to the UE according to the indication information, the configuration information being used for instructing the UE to resume the first data radio bearer according to the configuration information.

According to yet another embodiment of the application, a storage medium is also provided. The storage medium stores a computer program. When configured to run, the computer program performs steps in any of the above method embodiments.

According to yet another embodiment of the application, an electronic device is also provided, which includes a memory and a processor. The memory stores a computer program. The processor is configured to run the computer program, so as to perform steps in any of the above method embodiments.

In the embodiments of the present disclosure, the network-side network element may return, according to the indication information sent by the UE, the configuration information to the UE for the first data radio bearer needing to send the uplink data, so that the UE resumes the first data radio bearer according to the configuration information, so the problem in the related art of how to selectively resume a part of the required data radio bearers in the process of resuming data radio bearers can be solved, and the effect of resuming only a part of the data radio bearers according to the demand can be achieved.

BRIEF DESCRIPTION OF THE DRAWINGS

The accompanying drawings described here are used for providing further understanding of the application, and constitute a part of the application. Schematic embodiments of the application and description thereof are used for illustrating the application and not intended to form an improper limit to the application. In the accompanying drawings.

DETAILED DESCRIPTION OF THE EMBODIMENTS

The application is elaborated below with reference to the accompanying drawings and embodiments. It is to be noted that the embodiments in the application and characteristics in the embodiments may be combined without conflicts.

It should be noted that the description and claims of the application and terms "first", "second", etc. in the foregoing drawings are used for distinguishing similar objects rather than describing a specific sequence or a precedence order.

To further illustrate the technical solutions in the embodiments, a supplementary explanation of some technical terms involved in the embodiments is given below.

For UE in an RRC_INACTIVE state, context information of an Access Stratum (AS) of the UE is maintained in both a network-side network element and the UE. The context information of the AS includes a security context of the UE, configuration information of a Signaling Radio Bearer (SRB) and a Data Radio Bearer (DRB), information of a Protocol Data Unit (PDU) session and a Quality of Service (QoS) flow, configuration information of a Packet Data Convergence Protocol (PDCP) and a Radio Link Control (RLC) protocol and possible existing state information.

The UE in the RRC_INACTIVE state behaves similar to the UE in an RRC IDLE state, that is, there are no dedicated radio resources. The network-side network element maintains for the UE in an inactive state a connection between a control plane and a user plane from a Core Network (CN) and an access network element. The access network element that maintains the AS context of the UE is called an anchor node. The DRB of the UE in an RRC_INACTIVE state is in a suspended state.

The UE is resumed from the RRC_INACTIVE state to an RRC connected state through an RRC connection resume process. Specifically, the UE sends an RRC connection resume request message through a message MSG3 in an RACH procedure, the RRC connection resume request message carrying an Identity (ID) of the UE, the reason for connection resume, security verification information, etc. After receiving a message MSG4 sent by the network-side network element, the UE resumes the DRB that is in a suspended state of the UE according to the configuration in the locally saved AS context and the configuration information carried in the MSG4.

For the UE in a DC mode, in the DC mode, the UE simultaneously establishes data radio bearers with two different network-side network elements. One of the two different network-side network elements is called an MN of the UE, and the other is called an SN. The signaling radio bearers SRB0, SRB1 and optional SRB2 are established between the UE and the MN. The radio resource of an MCG that is configured for the UE by a network under an MN network element is called MCG configuration, and the radio resource of a Secondary Cell Group (SCG) configured under an SN network element is called SCG configuration.

Figure 1:
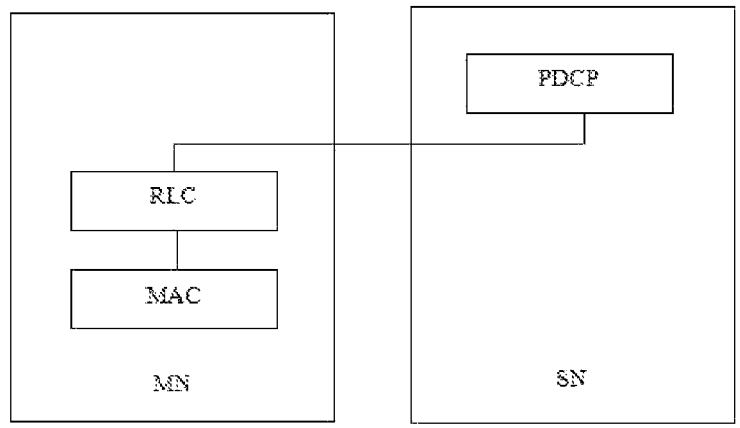
FIG. 1 is a schematic diagram of protocol entity distribution of an SN terminated Master Cell Group (MCG) bearer.

According to the different distribution of protocol layer entities of the data radio bearer between two network elements, the data radio bearers include: an MN terminated MCG bearer, an MN terminated SCG bearer, an MN terminated split bearer, an SN terminated MCG bearer, an SN terminated SCG bearer and an SN terminated split bearer. FIG. 1 is a schematic diagram of protocol entity distribution of an SN terminated Master Cell Group bearer. As shown in FIG. 1, the SN terminated Master Cell Group bearer is a radio bearer form in which a PDCP entity of the data radio bearer is established in the SN network element, and an RLC protocol entity and a Medium Access Control (MAC) protocol entity is established in the MN network element, and the SN terminated split bearer is a radio bearer form in which the PDCP entity of the data radio bearer is established in the SN network element, and the RLC protocol entity and the MAC protocol entity of the data radio bearer are respectively established in the MN network element and the SN network element.

In a conclusion of 3GPP discussion, when the UE configured with DC in the RRC connected state is switched to the RRC_INACTIVE state, the UE will locally save configuration information of Resource Blocks (RB) established in the MN and the SN (the configuration information of the RB includes: configuration information of the data radio bearer, the PDU session, the QoS flow and connection with the user plane of the CN), and will also save MCG configuration information and SCG configuration information, which respectively include the configuration information of an RLC bearer established in cells under the MN and the SN.

Embodiment One

Figure 2:
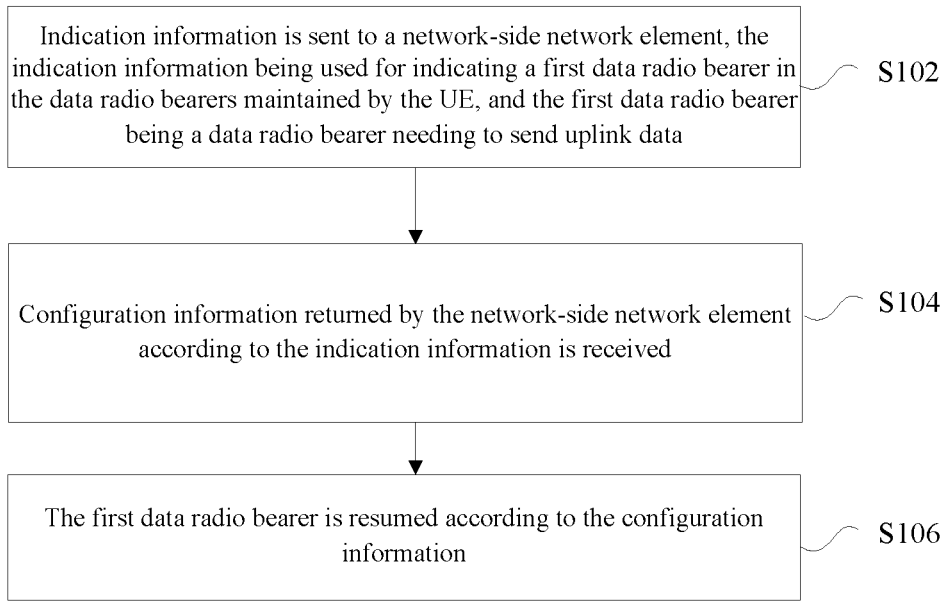
FIG. 2 is a flowchart of a method for resuming a data radio bearer according to an embodiment of the disclosure.

In the present embodiment, a method for resuming a data radio bearer is provided. FIG. 2 is a flowchart (1) of a method for resuming a data radio bearer according to an embodiment of the disclosure. As shown in FIG. 2, the flow includes the following steps.

At S102, indication information is sent to a network-side network element, the indication information being used for indicating a first data radio bearer in the data radio bearers maintained by the UE, and the first data radio bearer being a data radio bearer needing to send uplink data.

At S104, configuration information returned by the network-side network element according to the indication information is received.

At S106, the first data radio bearer is resumed according to the configuration information.

Through the above steps, the network-side network element may return, according to the indication information sent by the UE, the configuration information to the UE for the first data radio bearer needing to send uplink data, so that the UE resumes the first data radio bearer according to the configuration information, so the problem in the related art of how to selectively resume a part of the required data radio bearers in the process of resuming data radio bearers can be solved, and the effect of resuming only a part of the data radio bearers according to the demand can be achieved.

Specifically, in the above steps, by resuming a part of the data radio bearers, for the UE configured with DC, the side, needing to send uplink data, of the DC may be specifically selected to resume data radio bearer, so that the UE configured with DC may resume the corresponding data radio bearer. For the UE in other configurations, it is not necessary to resume all data radio bearers uniformly during an RRC resume process, so the RRC resume process of the UE is optimized to save signaling overhead, battery consumption and processing delay of the network and the UE.

In addition, the execution body of the above steps is the UE or a terminal.

Figure 3:
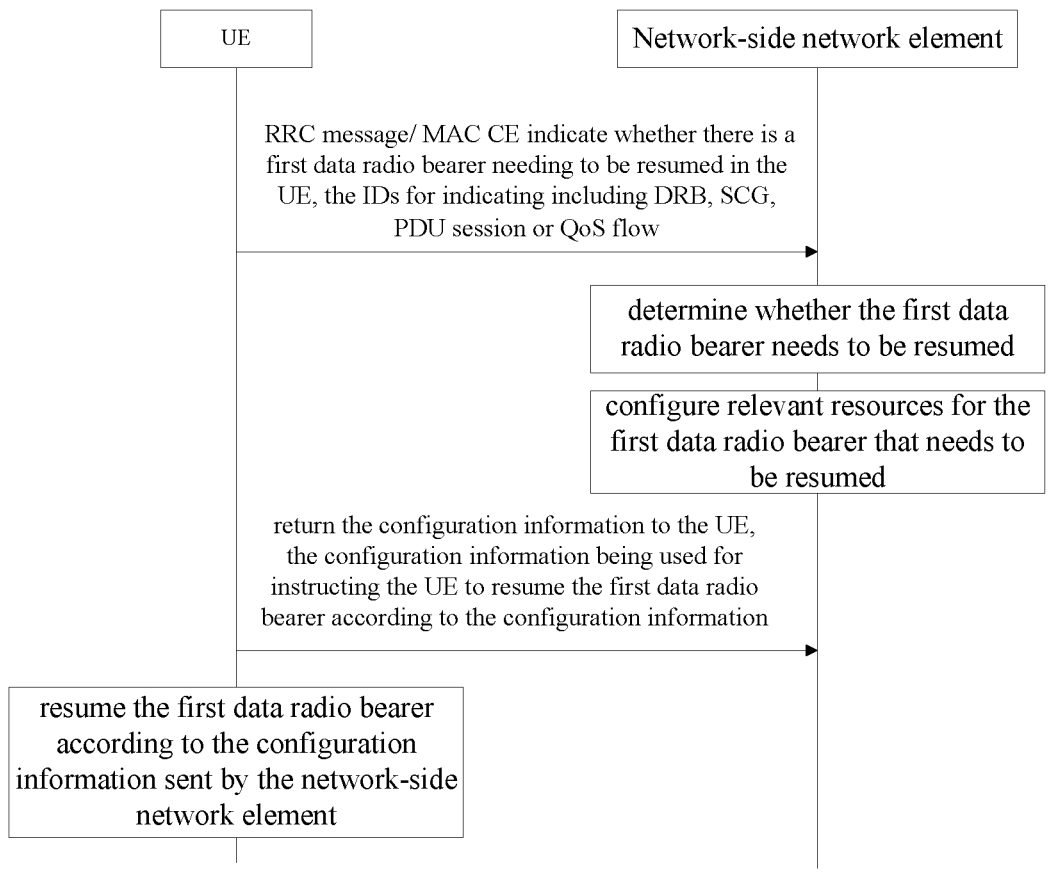
FIG. 3 is an interactive schematic diagram of a method for resuming a data radio bearer according to an embodiment of the disclosure.

Specifically, FIG. 3 is an interactive schematic diagram of a method for resuming a data radio bearer according to an embodiment of the disclosure. The interaction between the UE and the network-side network element may also be implemented in the following way:

the UE indicates, through an RRC message/a Medium Access Control Element (MAC CE), whether there is a first data radio bearer needing to be resumed in the UE to the network-side network element. The IDs for indicating include the DRB, the SCG, the PDU session or the QoS flow.

The network-side network element determines whether the first data radio bearer needs to be resumed, and configures relevant resources for the first data radio bearer that needs to be resumed.

The network-side network element returns the configuration information to the UE. The configuration information is used for instructing the UE to resume the first data radio bearer according to the configuration information.

The UE resumes the first data radio bearer according to the configuration information sent by the network-side network element.

In an embodiment, the indication information includes a first ID. The first ID is used for indicating the type of radio resource used by the first data radio bearer.

Specifically, the first ID is used for indicating that radio data resources used in first data radio resources are MCG resources or SCG resources. The first ID may specifically include at least one of the following objects:

a) there is uplink data of the data radio bearer using the SCG resources needing to be sent;

b) there is only the uplink data of the data radio bearer using the SCG resources needing to be sent;

c) there is uplink data of the data radio bearer using the MCG resources and the SCG resources needing to be sent;

d) there is uplink data of the data radio bearer using the MCG resources needing to be sent;

e) there is only the uplink data of the data radio bearer using the MCG resources needing to be sent;

f) there is no uplink data of the data radio bearer using the SCG resources needing to be sent; and g) there is no uplink data of the data radio bearer using the MCG resources needing to be sent.

It should be further noted that the type of relevant radio resources used in the first data radio resources may be effectively marked through the above objects in the first ID, so for the UE configured with the DC, in the RRC connection resume process, it can be clear through the first ID which type of data radio bearer corresponding to UE needs to be resumed.

In an embodiment, the indication information includes a second ID. The second ID is used for indicating a relevant ID of the first data radio bearer. The second ID includes at least one of the following objects:

an ID of the first data radio bearer; an ID of a logical channel and/or an ID of a logical channel group corresponding to the first data radio bearer; an ID of the PDU session corresponding to the first data radio bearer; and an ID of the QoS flow corresponding to the first data radio bearer.

Specifically, the second ID is used for indicating the specific object of the first data radio bearer or the specific position of the first data radio bearer. The expression forms of multiple objects in the second ID are as follows.

The ID of the first data radio bearer in the second ID may be expressed in one of the following forms:

a) a group of bitmaps, each bit in the bitmap being used for indicating whether the corresponding data radio bearer has the uplink data needing to be sent; for example, in the bit map with a length of 16 bits or 32 bits, the first bit is used for indicating the data radio bearer whose ID is 1, and so on; and b) a list of data radio bearer ID, each item in the list including a data radio bearer ID which indicates that the corresponding data radio bearer has or does not have the uplink data needing to be sent.

The ID of the logical channel and/or the ID of the logical channel group corresponding to the first data radio bearer in the second ID may be expressed in one of the following forms:

a) an ID used for indicating the logical channel of the logical channel group mapped in the SCG of the UE; in an embodiment, the ID may also be used for indicating information about the amount of data that the logical channel or the logical channel group needs to send;

b) an ID used for indicating the logical channel of the logical channel group mapped in the MCG of the UE; in an embodiment, the ID may also be used for indicating information about the amount of data that the logical channel or the logical channel group needs to send.

The ID of the PDU session corresponding to the first data radio bearer in the second ID may be expressed in one of the following forms:

a list of PDU session IDs, each item in the list including the ID of the PDU session which indicates that the corresponding PDU session has or does not have the uplink data needing to be sent.

The ID of the QoS flow corresponding to the first data radio bearer in the second ID may be expressed in one of the following forms:

a list of QoS flow IDs, which indicates that the corresponding QoS flow has or does not have the uplink data needing to be sent. The list includes a set of information as follows: a PDU Session ID and a set of QoS flow IDs under the PDU session.

It should be further noted that the specific object of the first data radio bearer may be learned through the second ID, so in the RRC connection resume process of the UE, the second ID may clarify the specific object of the data radio bearer needing to be resumed. The cooperative use of the first ID and the second ID enables the UE to achieve selective resume of the data radio bearer when it is configured with the DC or replaces a new connection object, so as to optimize the RRC connection resume process.

In an embodiment, the indication information is sent to the network-side network element through at least one of the following:

an information element included in an RRC message sent to the network-side network element and a MAC CE sent to the network-side network element.

Specifically, when the indication information is sent to the network-side network element through the information element included in the RRC message sent to the network-side network element, the specific object of the RRC message may be selected according to the different RRC states of the UE in the following way:

for the UE in an RRC inactive state, the above information is carried in MSG1 or MSG3 in an RACH procedure, the RRC message may be the RRC connection resume request message.

For the UE in the RRC connected state, the above information is carried in an uplink RRC message. Optionally, the UE carries the above information through an SCG failure information message. Optionally, the behavior of the UE sending the SCG failure information message means that there is uplink data needing to be sent through the data radio bearer mapped in the SCG. Optionally, the UE carries the above information through an RRC connection resume completion message.

In an embodiment, that the indication information is sent to the network-side network element through the MAC CE sent to the network-side network element includes: the MAC CE is redefined, the redefined MAC CE being used for indicating an SCG Buffer Status Report (SCG BSR) of buffer information of logical channel group mapped in the SCG, and the indication information is sent to the network-side network element through the redefined MAC CE; or, the buffer information of logical channel group for indicating the SCG is added in a BSR MAC CE, and the indication information is sent to the network-side network element through the BSR MAC CE.

Specifically, when the indication information is sent to the network-side network element according to the MAC CE sent to the network-side network element, the RRC state of the UE does not influence the selection of the MAC CE.

In an embodiment, that the configuration information sent by the network-side network element is received includes:

in the case that the UE in the RRC_INACTIVE state sends the indication information to the network-side network element, the RRC connection resume message sent by the network-side network element is received; and in the case that the UE in the RRC connected state sends the indication information to the network-side network element, the RRC connection reconfiguration message sent by the network-side network element is received.

It should be further noted that if the data radio bearer uses the SCG resources, the network-side network element also indicates the state information of the data radio bearer corresponding to the SN of the UE.

In an embodiment, the RRC connection resume message is obtained by the network-side network element according to the following objects:

Access stratum (AS) context information of the UE, which is obtained by the network-side network element according to the following objects: the indication information and the ID of the UE.

Specifically, in the case that the UE in the RRC_INACTIVE state sends the indication information to the network-side network element, the return of configuration information realized by the network-side network element may be performed by referring to the following step:

when the UE is in the RRC_INACTIVE state, the UE sends the indication information during the initiated RRC connection resume process, and the network-side network element determines the network-side network element where the AS context of the UE is (which is called the anchor node of the UE) according to the ID of the UE (UE Identity, UE resume ID or I-RNTI) carried in the received RRC connection resume request message, and sends a retrieve UE context request message to the anchor node. The anchor node of the UE carries the AS context information corresponding to the UE in a retrieve UE context response message sent to the network-side network element. The AS context information of the UE includes: an RRC message including the configuration information of the UE and security context information of the UE. After receiving the RRC message, the network-side network element may take the configuration information of the UE protected by the RRC message as the configuration information corresponding to the indication information.

In an embodiment, the RRC connection reconfiguration message or the RRC connection resume message includes at least one of the following objects:

SCG configuration information of the UE, used for instructing the UE to process the SCG;

data radio bearer state indication information of the UE, used for indicating the state of the data radio bearer maintained by the UE, and instructing the UE to process the data radio bearer according to the state of the data radio bearer;

PDU session state indication information of the UE, used for indicating the state of the PDU session corresponding to the data radio bearer maintained by the UE, and instructing the UE to process the PDU session according to the state of the PDU session corresponding to the data radio bearer; and QoS flow state indication information of the UE, used for indicating the state of the QoS flow corresponding to the data radio bearer maintained by the UE, and instructing the UE to process the QoS flow according to the state of the QoS flow.

It should be further noted that when the RRC connection reconfiguration message or the RRC connection resume message includes the SCG configuration information of the UE, the SCG configuration information is used for instructing the UE to process the SCG. Specifically, the SCG configuration information includes explicit indication or implicit indication to instruct the UE to activate the SCG. The explicit indication is to indicate whether the UE activates the SCG through an information element included in the RRC message. The implicit indication mode is that, by agreement, if the RRC message includes SCG configuration, the SCG is to be activated.

At the same time, prior to this, the network-side network element also needs to determine whether to configure the resources in the SN network element for the UE. If it is determined to configure the resources in the SN network element for the UE, the network-side network element determines the SN network element of the UE, instructs the SN network element of the UE to configure the radio resources for the UE according to the SCG configuration of the UE, and carries the SCG configuration of the UE in the RRC message to instruct the UE to activate the SCG. If it is determined not to configure the resources in the SN network element for the UE, the network-side network element does not include the SCG configuration in the RRC message sent to the UE, or includes the SCG configuration, but explicitly instructs the UE not to activate the SCG.

When the RRC connection reconfiguration message or the RRC connection resume message includes the data radio bearer state indication information of the UE, the data radio bearer state indication information is used for indicating the state of the data radio bearer maintained by the UE, and instructing the UE to process the data radio bearer according to the state of the data radio bearer. Specifically, the data radio bearer state indication information includes explicit or implicit data radio bearer state indication. The explicit data radio bearer state indication is used for indicating the UE whether the corresponding data radio bearer is in a resumed state or a suspended state. The data radio bearer state indication information may be a bit defined by a data radio bearer. The implicit data radio bearer state indication is that if the configuration information of the data radio bearer is carried in the RRC message, it indicates that the data radio bearer is to be activated.

At the same time, prior to this, the network-side network element determines whether to activate a certain data radio bearer of the UE. If it is determined to activate a certain data radio bearer of the UE, the network-side network element configures the radio resources for the data radio bearer to be activated as indicated above, and instructs explicitly or implicitly, in the RRC message, the UE to activate the data radio bearer. If it is determined not to activate a certain data radio bearer of the UE, a serving node instructs explicitly or implicitly, in the RRC message, the UE to suspend or continue to suspend the corresponding data radio bearer.

When the RRC connection reconfiguration message or the RRC connection resume message includes the PDU session state indication information of the UE, that the PDU session state indication information is used for indicating the state of the PDU session corresponding to the data radio bearer maintained by the UE, and instructing the UE to process the PDU session according to the state of the PDU session corresponding to the data radio bearer. Specifically, the PDU session state indication information indicates the UE whether the corresponding PDU session state is an active state or a suspended state. The PDU session state indication information may be the value of a bit.

At the same time, prior to this, the network-side network element configures the radio resources for the data radio bearer corresponding to all QoS flows that corresponds to the PDU session indicated as the active state.

When the RRC connection reconfiguration message or the RRC connection resume message includes the QoS flow state indication information of the UE, the QoS flow state indication information is used for indicating the state of the QoS flow corresponding to the data radio bearer maintained by the UE, and instructing the UE to process the QoS flow according to the state of the QoS flow. Specifically, the QoS flow state indication information is used to indicate the UE whether the state of the corresponding QoS flow is an active state or a suspended state. The QoS flow state indication information may be the value of a bit.

At the same time, prior to this, the network-side network element configures the radio resources for the data radio bearer corresponding to the QoS flow indicated as the active state.

In an embodiment, that the first data radio bearer is resumed according to the configuration information includes at least one of the followings:

when the RRC connection reconfiguration message or the RRC connection resume message includes the SCG configuration information of the UE, according to the SCG configuration information and/or local SCG configuration information saved by the UE, the UE resumes the first data radio bearer corresponding to the SCG configuration information and/or the local SCG configuration information;

when the RRC connection reconfiguration message or the RRC connection resume message includes the data radio bearer state indication information of the UE, the UE resumes the first data radio bearer according to the data radio bearer state indication information and/or local data radio bearer state indication information saved by the UE;

when the RRC connection reconfiguration message or the RRC connection resume message includes the PDU session state indication information of the UE, the UE resumes the first data radio bearer mapped by all the QoS flows in the PDU session corresponding to the PDU session state indication information according to the PDU session state indication information;

when the RRC connection reconfiguration message or the RRC connection resume message includes the QoS flow state indication information of the UE, the UE resumes the first data radio bearer mapped by the QoS flow corresponding to the QoS flow state indication information according to the QoS flow state indication information.

It should be further noted that when the RRC connection reconfiguration message or the RRC connection resume message includes the SCG configuration information of the UE, the UE further performs the following operation: if the RRC message indicates to activate the SCG configuration, the UE applies the SCG configuration included in the RRC message or the locally saved SCG configuration, or applies the combination of the SCG configuration included in the RRC message and the locally saved SCG configuration, and activates the SCG, specifically synchronizing to the specified SCG Primary Cell (PCell) through the RACH procedure, and activating the data radio bearer using the SCG resources.

When the RRC connection reconfiguration message or the RRC connection resume message includes the data radio bearer state indication information of the UE, the UE further performs the following operation: if the message indicates that the state of a data radio bearer is the active state and the RRC message includes the configuration of the data radio bearer, then the UE applies the configuration of the data radio bearer included in the RRC message, or the UE applies the locally saved configuration of the data radio bearer and activates the data radio bearer. If the RRC message indicates that the state of a data radio bearer is the suspended state, then the UE suspends the data radio bearer or maintains it in the suspended state.

When the RRC connection reconfiguration message or the RRC connection resume message includes the PDU session state indication information of the UE, the UE further performs the following operation: if the RRC message indicates that the state of a PDU session is the active state, the UE activates the data radio bearer mapped by all the QoS flows under the PDU session.

When the RRC connection reconfiguration message or the RRC connection resume message includes the QoS flow state indication information of the UE, the UE further performs the following operation: if the RRC message indicates that the state of a QoS flow is the active state, the UE activates the data radio bearer mapped by the QoS flow.

Through the above description of the implementations, those skilled in the art may clearly know that the method according to the above embodiments may be implemented by means of software plus a necessary common hardware platform, certainly by means of hardware; but in many cases, the former is the better implementation. Based on this understanding, the technical solution of the application can be embodied in the form of software product; the computer software product is stored in a storage medium (for example, a Read-Only Memory (ROM)/Random Access Memory (RAM), a magnetic disk, and a compact disc) and includes a number of instructions to make a computer device (which can be a personal computer, a server or a network device, etc.) perform all or part of the method in each embodiment of the present disclosure.

Embodiment Two

Figure 4:
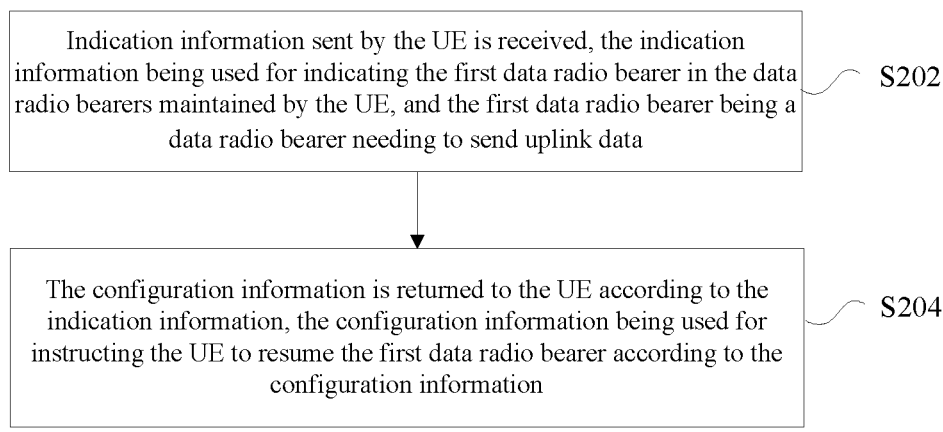
FIG. 4 is a flowchart of a method for resuming a data radio bearer according to another embodiment of the disclosure.

In the present embodiment, a method for resuming a data radio bearer is provided. FIG. 4 is a flowchart (2) of a method for resuming a data radio bearer according to an embodiment of the disclosure. As shown in FIG. 4, the flow includes the following steps.

At S202, indication information sent by the UE is received, the indication information being used for indicating the first data radio bearer in the data radio bearers maintained by the UE, and the first data radio bearer being a data radio bearer needing to send uplink data.

At S204, the configuration information is returned to the UE according to the indication information, the configuration information being used for instructing the UE to resume the first data radio bearer according to the configuration information.

Through the above steps, the network-side network element may return, according to the indication information sent by the UE, the configuration information to the UE for the first data radio bearer needing to send uplink data, so that the UE resumes the first data radio bearer according to the configuration information, so the problem in the related art of how to selectively resume a part of the required data radio bearers in the process of resuming data radio bearers can be solved, and the effect of resuming only a part of the data radio bearers according to the demand can be achieved.

In an embodiment, the indication information includes a first ID. The first ID is used for indicating the type of radio resource used by the first data radio bearer.

Specifically, the first ID is used for indicating that radio data resources used in first data radio resources are MCG resources or SCG resources. The first ID may specifically include at least one of the following objects:

a) there is uplink data of the data radio bearer using the SCG resources needing to be sent;

b) there is only the uplink data of the data radio bearer using the SCG resources needing to be sent;

c) there is uplink data of the data radio bearer using the MCG resources and the SCG resources needing to be sent;

d) there is uplink data of the data radio bearer using the MCG resources needing to be sent;

e) there is only the uplink data of the data radio bearer using the MCG resources needing to be sent;

f) there is no uplink data of the data radio bearer using the SCG resources needing to be sent; and g) there is no uplink data of the data radio bearer using the MCG resources needing to be sent.

It should be further noted that the type of relevant radio resources used in the first data radio resources may be effectively marked through the above objects in the first ID, so for the UE configured with DC, in the RRC connection resume process, it can be clear through the first ID which type of data radio bearer corresponding to UE needs to be resumed.

In an embodiment, the indication information includes a second ID. The second ID is used for indicating a specific object of the first data radio bearer. The second ID includes at least one of the following objects:

an ID of the first data radio bearer; an ID of a logical channel and/or an ID of a logical channel group corresponding to the first data radio bearer; an ID of the PDU session corresponding to the first data radio bearer; and an ID of the QoS flow corresponding to the first data radio bearer.

Specifically, the second ID is used for indicating the specific object of the first data radio bearer or the specific position of the first data radio bearer. The expression forms of multiple objects in the second ID are as follows.

The ID of the first data radio bearer in the second ID may be expressed in one of the following forms:

a) a group of bitmaps, each bit in the bitmap being used for indicating whether the corresponding data radio bearer has the uplink data needing to be sent; for example, in the bit map with a length of 16 bits or 32 bits, the first bit is used for indicating the data radio bearer whose ID is 1, and so on; and b) a list of data radio bearer IDs, each item in the list including a data radio bearer ID which indicates that the corresponding data radio bearer has or does not have the uplink data needing to be sent.

The ID of the logical channel and/or the ID of the logical channel group corresponding to the first data radio bearer in the second ID may be expressed in one of the following forms:

a) an ID used for indicating the logical channel of the logical channel group mapped in the SCG of the UE; optionally, the ID may also be used for indicating information about the amount of data that the logical channel or the logical channel group needs to send;

b) an ID used for indicating the logical channel of the logical channel group mapped in the MCG of the UE; optionally, the ID may also be used for indicating information about the amount of data that the logical channel or the logical channel group needs to send.

The ID of the PDU session corresponding to the first data radio bearer in the second ID may be expressed in one of the following forms:

a list of PDU session IDs, each item in the list including the ID of the PDU session which indicates that the corresponding PDU session has or does not have the uplink data needing to be sent.

The ID of the QoS flow corresponding to the first data radio bearer in the second ID may be expressed in one of the following forms:

a list of QoS flow IDs, which indicates that the corresponding QoS flow has or does not have the uplink data needing to be sent. The list includes a set of information as follows: a PDU Session ID and a set of QoS flow IDs under the PDU session.

It should be further noted that the specific object of the first data radio bearer may be learned through the second ID, so in the RRC connection resume process of the UE, the second ID may clarify the specific object of the data radio bearer needing to be resumed. The cooperative use of the first ID and the second ID enables the UE to achieve selective resume of the data radio bearer when it is configured with DC or replaces a new connection object, so as to optimize the RRC connection resume process.

In an embodiment, that the configuration information is returned to the UE according to the indication information includes:

when the received indication information is sent by the UE in the RRC_INACTIVE state, the RRC connection resume message is returned to the UE; and when received indication information is sent by the UE in the RRC connected state, the RRC connection reconfiguration message is returned to the UE.

In an embodiment, the RRC connection reconfiguration message or the RRC connection resume message includes at least one of the following objects:

the SCG configuration information of the UE, used for instructing the UE to process the SCG;

the data radio bearer state indication information of the UE, used for indicating the state of the data radio bearer maintained by the UE, and instructing the UE to process the data radio bearer according to the state of the data radio bearer;

the PDU session state indication information of the UE, used for indicating the state of the PDU session corresponding to the data radio bearer maintained by the UE, and instructing the UE to process the PDU session according to the state of the PDU session corresponding to the data radio bearer; and the QoS flow state indication information of the UE, used for indicating the state of the QoS flow corresponding to the data radio bearer maintained by the UE, and instructing the UE to process the QoS flow according to the state of the QoS flow.

It should be further noted that when the RRC connection reconfiguration message or the RRC connection resume message includes the SCG configuration information of the UE, the SCG configuration information is used for instructing the UE to process the SCG. Specifically, the SCG configuration information includes explicit or implicit indication to instruct the UE to activate the SCG. The explicit indication is to indicate whether the UE activates the SCG through an information element included in the RRC message. The implicit indication is that, by agreement, if the RRC message includes SCG configuration, the SCG is to be activated.

At the same time, prior to this, the network-side network element also needs to determine whether the resources in the SN network element are configured for the UE. If it is determined to configure the resources in the SN network element for the UE, the network-side network element determines the SN network element of the UE, instructs the SN network element of the UE to configure the radio resources for the UE according to the SCG configuration of the UE, and carries the SCG configuration of the UE in the RRC message to instruct the UE to activate the SCG. If it is determined not to configure the resources in the SN network element for the UE, the network-side network element does not include the SCG configuration in the RRC message sent to the UE, or includes the SCG configuration, but explicitly instructs the UE not to activate the SCG.

When the RRC connection reconfiguration message or the RRC connection resume message includes the data radio bearer state indication information of the UE, the data radio bearer state indication information is used for indicating the state of the data radio bearer maintained by the UE, and instructing the UE to process the data radio bearer according to the state of the data radio bearer. Specifically, the data radio bearer indication information includes explicit or implicit data radio bearer state indication information. The explicit data radio bearer state indication is used for indicating the UE whether the corresponding data radio bearer is in a resumed state or a suspended state. The data radio bearer state indication information may be a bit defined by a data radio bearer. The implicit data radio bearer state indication is that if the configuration information of the data radio bearer is carried in the RRC message, it indicates that the data radio bearer is to be activated.

At the same time, prior to this, the network-side network element determines whether to activate a certain data radio bearer of the UE. If it is determined to activate a certain data radio bearer of the UE, the network-side network element configures the radio resources for the data radio bearer to be activated as indicated above, and instructs explicitly or implicitly, in the RRC message, the UE to activate the data radio bearer. If it is determined not to activate a certain data radio bearer of the UE, the serving node instructs explicitly or implicitly, in the RRC message, the UE to suspend or continue to suspend the corresponding data radio bearer.

When the RRC connection reconfiguration message or the RRC connection resume message includes the PDU session state indication information of the UE, that the PDU session state indication information is used for indicating the state of the PDU session corresponding to the data radio bearer maintained by the UE, and instructing the UE to process the PDU session according to the state of the PDU session corresponding to the data radio bearer. Specifically, the PDU session state indication information indicates the UE whether the corresponding PDU session state is an active state or a suspended state. The PDU session state indication information may be the value of a bit.

At the same time, prior to this, the network-side network element configures the radio resources for the data radio bearer corresponding to all QoS flows that corresponds to the PDU session indicated as the active state.

When the RRC connection reconfiguration message or the RRC connection resume message includes the QoS flow state indication information of the UE, the QoS flow state indication information is used for indicating the state of the QoS flow corresponding to the data radio bearer maintained by the UE, and instructing the UE to process the QoS flow according to the state of the QoS flow. Specifically, the QoS flow state indication information is used to indicate the UE whether the state of the corresponding QoS flow is an active state or a suspended state. The QoS flow state indication information can be a bit value.

At the same time, prior to this, the network-side network element configures the radio resources for the data radio bearer corresponding to the QoS flow indicated as the active state.

Through the above description of the implementations, those skilled in the art may clearly know that the method according to the above embodiments may be implemented by means of software plus a necessary common hardware platform, certainly by means of hardware; but in many cases, the former is the better implementation. Based on this understanding, the technical solution of the application substantially or the part making a contribution to the related technology can be embodied in the form of software product; the computer software product is stored in a storage medium (for example, an ROM/an RAM, a magnetic disk, and a compact disc) and includes a number of instructions to make a computer device (which can be a personal computer, a server or a network device, etc.) perform all or part of the method in each embodiment of the present disclosure.

Embodiment Three

In the present embodiment, a device for resuming a data radio bearer is also provided, which is configured to implement the above embodiments and preferred implementations. The embodiments which have been elaborated will not be repeated here. The term "module" used below can realize a combination of software and/or hardware with an intended function. Although the device described in the following embodiment is realized through software better, the realization through hardware or a combination of software and hardware is possible and conceived.

Figure 5:
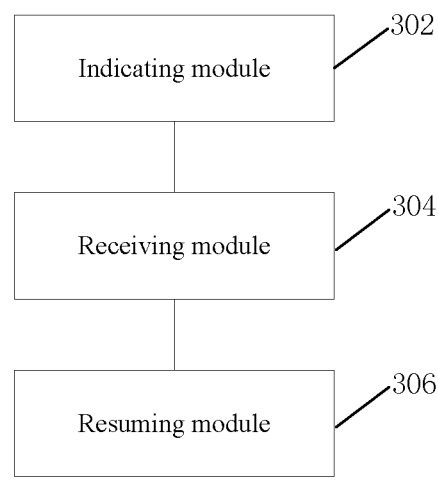
FIG. 5 is a structural block diagram of a device for resuming a data radio bearer according to an embodiment of the disclosure.

FIG. 5 is a structural block diagram (1) of a device for resuming a data radio bearer according to an embodiment of the disclosure. As shown in FIG. 5, the device includes: an indicating module 302, a receiving module 304 and a resuming module 306.

The indicating module 302 is configured to send indication information to the network-side network element, the indication information being used for indicating the first data radio bearer in the data radio bearers maintained by the UE, and the first data radio bearer being a data radio bearer needing to send the uplink data.

The receiving module 304 is configured to receive the configuration information returned by the network-side network element according to the indication information.

The resuming module 306 is configured to resume the first data radio bearer according to the configuration information.

Through the above device, the network-side network element may return, according to the indication information sent by the UE, the configuration information to the UE for the first data radio bearer needing to send uplink data, so that the UE resumes the first data radio bearer according to the configuration information, so the problem in the related art of how to selectively resume a part of the required data radio bearers in the process of resuming data radio bearers can be solved, and the effect of resuming only a part of the data radio bearers according to the demand can be achieved.

In an embodiment, the indication information sent by the indicating module 302 includes a first ID. The first ID is used for indicating the type of radio resource used by the first data radio bearer.

Specifically, the first ID is used for indicating that radio data resources used in first data radio resources are MCG resources or SCG resources. The first ID may specifically include at least one of the following objects:

a) there is uplink data of the data radio bearer using the SCG resources needing to be sent;

b) there is only the uplink data of the data radio bearer using the SCG resources needing to be sent;

c) there is uplink data of the data radio bearer using the MCG resources and the SCG resources needing to be sent;

d) there is uplink data of the data radio bearer using the MCG resources needing to be sent;

e) there is only the uplink data of the data radio bearer using the MCG resources needing to be sent;

f) there is no uplink data of the data radio bearer using the SCG resources needing to be sent; and g) there is no uplink data of the data radio bearer using the MCG resources needing to be sent.

It should be further noted that the type of relevant radio resources used in the first data radio resources may be effectively marked through the above objects in the first ID, so for the UE configured with the DC, in the RRC connection resume process, it can be clear through the first ID which type of data radio bearer corresponding to UE needs to be resumed.

In an embodiment, the indication information sent by the indicating module 302 includes a second ID. The second ID is used for indicating the specific object of the first data radio bearer. The second ID includes at least one of the following objects:

an ID of the first data radio bearer; an ID of a logical channel and/or an ID of a logical channel group corresponding to the first data radio bearer; an ID of the PDU session corresponding to the first data radio bearer; and an ID of the QoS flow corresponding to the first data radio bearer.

Specifically, the second ID is used for indicating the specific object of the first data radio bearer or the specific position of the first data radio bearer. The expression forms of multiple objects in the second ID are as follows.

The ID of the first data radio bearer in the second ID may be expressed in one of the following forms:

a) a group of bitmaps, each bit in the bitmap being used for indicating whether the corresponding data radio bearer has the uplink data needing to be sent; for example, in the bit map with a length of 16 bits or 32 bits, the first bit is used for indicating the data radio bearer whose ID is 1, and so on; and b) a list of data radio bearer IDs, each item in the list including a data radio bearer ID which indicates that the corresponding data radio bearer has or does not have the uplink data needing to be sent.

The ID of the logical channel and/or the ID of the logical channel group corresponding to the first data radio bearer in the second ID may be expressed in one of the following forms:

a) an ID used for indicating the logical channel of the logical channel group mapped in the SCG of the UE; optionally, the ID may also be used for indicating information about the amount of data that the logical channel or the logical channel group needs to send;

b) an ID used for indicating the logical channel of the logical channel group mapped in the MCG of the UE; optionally, the ID may also be used for indicating information about the amount of data that the logical channel or the logical channel group needs to send.

The ID of the PDU session corresponding to the first data radio bearer in the second ID may be expressed in one of the following forms:

a list of PDU session IDs, each item in the list including the ID of the PDU session which indicates that the corresponding PDU session has or does not have the uplink data needing to be sent.

The ID of the QoS flow corresponding to the first data radio bearer in the second ID may be expressed in one of the following forms:

a list of QoS flow IDs, which indicates that the corresponding QoS flow has or does not have the uplink data needing to be sent. The list includes a set of information as follows: a PDU Session ID and a set of QoS flow IDs under the PDU session.

It should be further noted that the specific object of the first data radio bearer may be learned through the second ID, so in the RRC connection resume process of the UE, the second ID may clarify the specific object of the data radio bearer needing to be resumed. The cooperative use of the first ID and the second ID enables the UE to achieve selective resume of the data radio bearer when it is configured with the DC or replaces a new connection object, so as to optimize the RRC connection resume process.

Optionally, for the receiving module 304, that the configuration information sent by the network-side network element is received includes that:

in the case that the UE in the RRC_INACTIVE state sends the indication information to the network-side network element, the RRC connection resume message sent by the network-side network element is received; and in the case that the UE in the RRC connected state sends the indication information to the network-side network element, the RRC connection reconfiguration message sent by the network-side network element is received.

In an embodiment, the RRC connection resume message is obtained by the network-side network element according to the following objects:

the AS context information of the UE, which is obtained by the network-side network element according to the following objects: the indication information and the ID of the UE.

Specifically, in the case that the UE in the RRC_INACTIVE state sends the indication information to the network-side network element, the return of configuration information realized by the network-side network element may be performed by referring to the following steps:

when the UE is in the RRC_INACTIVE state, the UE sends the indication information during the initiated RRC connection resume process, and the network-side network element determines the network-side network element where the AS context of the UE is (which is called the anchor node of the UE) according to the ID of the UE (UE Identity, UE resume ID or I-RNTI) carried in the received RRC connection resume request message, and sends a retrieve UE context request message to the anchor node. The anchor node of the UE carries the AS context information corresponding to the UE in a retrieve UE context response message sent to the network-side network element. The AS context information of the UE includes: an RRC message including the configuration information of the UE and security context information of the UE. After receiving the RRC message, the network-side network element may take the configuration information of the UE protected by the RRC message as the configuration information corresponding to the indication information.

In an embodiment, in the receiving module 304, the RRC connection reconfiguration message or the RRC connection resume message includes at least one of the following objects:

the SCG configuration information of the UE, used for instructing the UE to process the SCG;

the data radio bearer state indication information of the UE, used for indicating the state of the data radio bearer maintained by the UE, and instructing the UE to process the data radio bearer according to the state of the data radio bearer;

the PDU session state indication information of the UE, used for indicating the state of the PDU session corresponding to the data radio bearer maintained by the UE, and instructing the UE to process the PDU session according to the state of the PDU session corresponding to the data radio bearer; and the QoS flow state indication information of the UE, used for indicating the state of the QoS flow corresponding to the data radio bearer maintained by the UE, and instructing the UE to process the QoS flow according to the state of the QoS flow.

It should be further noted that when the RRC connection reconfiguration message or the RRC connection resume message includes the SCG configuration information of the UE, the SCG configuration information is used for instructing the UE to process the SCG. Specifically, the SCG configuration information includes explicit or implicit indication to instruct the UE to activate the SCG. The explicit indication is to indicate whether the UE activates the SCG through an information element included in the RRC message. The implicit indication is that, by agreement, if the RRC message includes SCG configuration, the SCG is to be activated.

At the same time, prior to this, the network-side network element also needs to determine whether the resources in the SN network element are configured for the UE. If it is determined to configure the resources in the SN network element for the UE, the network-side network element determines the SN network element of the UE, instructs the SN network element of the UE to configure the radio resources for the UE according to the SCG configuration of the UE, and carries the SCG configuration of the UE in the RRC message to instruct the UE to activate the SCG. If it is determined not to configure the resources in the SN network element for the UE, the network-side network element does not include the SCG configuration in the RRC message sent to the UE, or includes the SCG configuration, but explicitly instructs the UE not to activate the SCG.

When the RRC connection reconfiguration message or the RRC connection resume message includes the data radio bearer state indication information of the UE, that the data radio bearer state indication information is used for indicating the state of the data radio bearer maintained by the UE, and instructing the UE to process the data radio bearer according to the state of the data radio bearer. Specifically, the data radio bearer state indication information includes explicit or implicit data radio bearer state indication. The explicit data radio bearer state indication is used for indicating the UE whether the corresponding data radio bearer is in a resumed state or a suspended state. The data radio bearer state indication information may be a bit defined by a data radio bearer. The implicit data radio bearer state indication is that if the configuration information of the data radio bearer is carried in the RRC message, it indicates that the data radio bearer is to be activated.

At the same time, prior to this, the network-side network element determines whether to activate a certain data radio bearer of the UE. If it is determined to activate a certain data radio bearer of the UE, the network-side network element configures the radio resources for the data radio bearer to be activated as indicated above, and instructs explicitly or implicitly, in the RRC message, the UE to activate the data radio bearer. If it is determined not to activate a certain data radio bearer of the UE, the serving node instructs explicitly or implicitly, in the RRC message, the UE to suspend or continue to suspend the corresponding data radio bearer.

When the RRC connection reconfiguration message or the RRC connection resume message includes the PDU session state indication information of the UE, that the PDU session state indication information is used for indicating the state of the PDU session corresponding to the data radio bearer maintained by the UE, and instructing the UE to process the PDU session according to the state of the PDU session corresponding to the data radio bearer. Specifically, the PDU session state indication information indicates the UE whether the corresponding PDU session state is an active state or a suspended state. The PDU session state indication information may be the value of a bit.

At the same time, prior to this, the network-side network element configures the radio resources for the data radio bearer corresponding to all QoS flows that corresponds to the PDU session indicated as the active state.

When the RRC connection reconfiguration message or the RRC connection resume message includes the QoS flow state indication information of the UE, the QoS flow state indication information is used for indicating the state of the QoS flow corresponding to the data radio bearer maintained by the UE, and instructing the UE to process the QoS flow according to the state of the QoS flow. Specifically, the QoS flow state indication information is used to indicate the UE whether the state of the corresponding QoS flow is an active state or a suspended state. The QoS flow state indication information can be a bit value.

At the same time, prior to this, the network-side network element configures the radio resources for the data radio bearer corresponding to the QoS flow indicated as the active state.

It is to be noted that, each of the above modules may be realized by software or hardware. For the latter, the each of the above modules may be realized by, but not limited to, the following way: all of the above modules are in the same processor; or, the above modules are respectively in different processors in form of any combination.

Embodiment Four

In the present embodiment, a device for resuming a data radio bearer is also provided, which is configured to implement the above embodiments and preferred implementations. The embodiments which have been elaborated will not be repeated here. The term "module" used below can realize a combination of software and/or hardware with an intended function. Although the device described in the following embodiment is realized through software better, the realization through hardware or a combination of software and hardware is possible and conceived.

Figure 6:
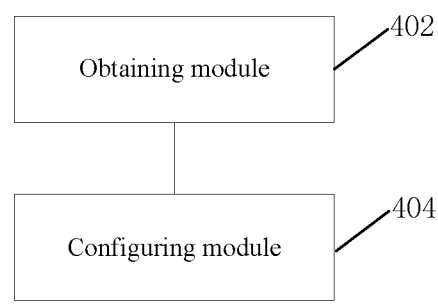
FIG. 6 is a structural block diagram of a device for resuming a data radio bearer according to another embodiment of the disclosure.

FIG. 6 is a structural block diagram (2) of a device for resuming a data radio bearer according to an embodiment of the disclosure. As shown in FIG. 6, the device includes: an obtaining module 402 and a configuring module 404.

The obtaining module 402 is configured to receive indication information sent by the UE, the indication information being used for indicating the first data radio bearer in the data radio bearers maintained by the UE, and the first data radio bearer being a data radio bearer needing to send the uplink data.

The configuring module 404 is configured to return the configuration information to the UE according to the indication information, the configuration information being used for instructing the UE to resume the first data radio bearer according to the configuration information.

Through the above device, the network-side network element may return, according to the indication information sent by the UE, the configuration information to the UE for the first data radio bearer needing to send uplink data, so that the UE resumes the first data radio bearer according to the configuration information, so the problem in the related art of how to selectively resume a part of the required data radio bearers in the process of resuming data radio bearers can be solved, and the effect of resuming only a part of the data radio bearers according to the demand can be achieved.

In an embodiment, in the obtaining module 402, the indication information includes: a first ID. The first ID is used for indicating the type of radio resource used by the first data radio bearer.

Specifically, the first ID is used for indicating that radio data resources used in first data radio resources are MCG resources or SCG resources. The first ID may specifically include at least one of the following objects:

a) there is uplink data of the data radio bearer using the SCG resources needing to be sent;

b) there is only the uplink data of the data radio bearer using the SCG resources needing to be sent;

c) there is uplink data of the data radio bearer using the MCG resources and the SCG resources needing to be sent;

d) there is uplink data of the data radio bearer using the MCG resources needing to be sent;

e) there is only the uplink data of the data radio bearer using the MCG resources needing to be sent;

f) there is no uplink data of the data radio bearer using the SCG resources needing to be sent; and g) there is no uplink data of the data radio bearer using the MCG resources needing to be sent.

It should be further noted that the type of relevant radio resources used in the first data radio resources may be effectively marked through the above objects in the first ID, so for the UE configured with DC, in the RRC connection resume process, it can be clear through the first ID which type of data radio bearer corresponding to UE needs to be resumed.

In an embodiment, in the obtaining module 402, the indication information includes: a second ID. The second ID is used for indicating the specific object of the first data radio bearer. The second ID includes at least one of the following objects:

the ID of the first data radio bearer; the ID of a logical channel and/or the ID of a logical channel group corresponding to the first data radio bearer; the ID of the PDU session corresponding to the first data radio bearer; and the ID of the QoS flow corresponding to the first data radio bearer.

Specifically, the second ID is used for indicating the specific object of the first data radio bearer or the specific position of the first data radio bearer. The expression forms of multiple objects in the second ID are as follows.

The ID of the first data radio bearer in the second ID may be expressed in one of the following forms:

a) a group of bitmaps, each bit in the bitmap being used for indicating whether the corresponding data radio bearer has the uplink data needing to be sent; for example, in the bit map with a length of 16 bits or 32 bits, the first bit is used for indicating the data radio bearer whose ID is 1, and so on; and b) a list of data radio bearer IDs, each item in the list including a data radio bearer ID which indicates that the corresponding data radio bearer has or does not have the uplink data needing to be sent.

The ID of the logical channel and/or the ID of the logical channel group corresponding to the first data radio bearer in the second ID may be expressed in one of the following forms:

a) an ID used for indicating the logical channel of the logical channel group mapped in the SCG of the UE; optionally, the ID may also be used for indicating information about the amount of data that the logical channel or the logical channel group needs to send;

b) an ID used for indicating the logical channel of the logical channel group mapped in the MCG of the UE; optionally, the ID may also be used for indicating information about the amount of data that the logical channel or the logical channel group needs to send.

The ID of the PDU session corresponding to the first data radio bearer in the second ID may be expressed in one of the following forms:

a list of PDU session IDs, each item in the list including the ID of the PDU session which indicates that the corresponding PDU session has or does not have the uplink data needing to be sent.

The ID of the QoS flow corresponding to the first data radio bearer in the second ID may be expressed in one of the following forms:

a list of QoS flow IDs, which indicates that the corresponding QoS flow has or does not have the uplink data needing to be sent. The list includes a set of information as follows: a PDU Session ID and a set of QoS flow IDs under the PDU session.

It should be further noted that the specific object of the first data radio bearer may be learned through the second ID, so in the RRC connection resume process of the UE, the second ID may clarify the specific object of the data radio bearer needing to be resumed. The cooperative use of the first ID and the second ID enables the UE to achieve selective resume of the data radio bearer when it is configured with the DC or replaces a new connection object, so as to optimize the RRC connection resume process.

In an embodiment, in the configuring module 404, the configuration information is returned to the UE according to the indication information includes that:

when the received indication information is sent by the UE in the RRC_INACTIVE state, the RRC connection resume message is returned to the UE; and when received indication information is sent by the UE in the RRC connected state, the RRC connection reconfiguration message is returned to the UE.

In an embodiment, in the configuring module 404, the RRC connection reconfiguration message or the RRC connection resume message includes at least one of the following objects:

the SCG configuration information of the UE, used for instructing the UE to process the SCG;

the data radio bearer state indication information of the UE, used for indicating the state of the data radio bearer maintained by the UE, and instructing the UE to process the data radio bearer according to the state of the data radio bearer;

the PDU session state indication information of the UE, used for indicating the state of the PDU session corresponding to the data radio bearer maintained by the UE, and instructing the UE to process the PDU session according to the state of the PDU session corresponding to the data radio bearer; and the QoS flow state indication information of the UE, used for indicating the state of the QoS flow corresponding to the data radio bearer maintained by the UE, and instructing the UE to process the QoS flow according to the state of the QoS flow.

It should be further noted that when the RRC connection reconfiguration message or the RRC connection resume message includes the SCG configuration information of the UE, the SCG configuration information is used for instructing the UE to process the SCG. Specifically, the SCG configuration information includes explicit or implicit indication for instructing the UE to activate the SCG. The explicit indication is to indicate whether the UE activates the SCG through an information element included in the RRC message. The implicit indication is that by agreement, if the RRC message includes SCG configuration, the SCG is to be activated.

At the same time, prior to this, the network-side network element also needs to determine whether the resources in the SN network element are configured for the UE. If it is determined to configure the resources in the SN network element for the UE, the network-side network element determines the SN network element of the UE, instructs the SN network element of the UE to configure the radio resources for the UE according to the SCG configuration of the UE, and carries the SCG configuration of the UE in the RRC message to instruct the UE to activate the SCG. If it is determined not to configure the resources in the SN network element for the UE, the network-side network element does not include the SCG configuration in the RRC message sent to the UE, or includes the SCG configuration, but explicitly instructs the UE not to activate the SCG.

When the RRC connection reconfiguration message or the RRC connection resume message includes the data radio bearer state indication information of the UE, that the data radio bearer state indication information is used for indicating the state of the data radio bearer maintained by the UE, and instructing the UE to process the data radio bearer according to the state of the data radio bearer. Specifically, the data radio bearer state indication includes explicit or implicit data radio bearer state indication. The explicit data radio bearer state indication is used for indicating the UE whether the corresponding data radio bearer is in a resumed state or a suspended state. The data radio bearer state indication information may be a bit defined by a data radio bearer. The implicit data radio bearer state indication is that if the configuration information of the data radio bearer is carried in the RRC message, it indicates that the data radio bearer is to be activated.

At the same time, prior to this, the network-side network element determines whether to activate a certain data radio bearer of the UE. If it is determined to activate a certain data radio bearer of the UE, the network-side network element configures the radio resources for the data radio bearer to be activated as indicated above, and instructs explicitly or implicitly, in the RRC message, the UE to activate the data radio bearer. If it is determined not to activate a certain data radio bearer of the UE, the serving node instructs explicitly or implicitly, in the RRC message, the UE to suspend or continue to suspend the corresponding data radio bearer.

When the RRC connection reconfiguration message or the RRC connection resume message includes the PDU session state indication information of the UE, that the PDU session state indication information is used for indicating the state of the PDU session corresponding to the data radio bearer maintained by the UE, and instructing the UE to process the PDU session according to the state of the PDU session corresponding to the data radio bearer. Specifically, the PDU session state indication information indicates the UE whether the corresponding PDU session state is an active state or a suspended state. The PDU session state indication information may be the value of a bit.

At the same time, prior to this, the network-side network element configures the radio resources for the data radio bearer corresponding to all QoS flows that corresponds to the PDU session indicated as the active state.

When the RRC connection reconfiguration message or the RRC connection resume message includes the QoS flow state indication information of the UE, that the QoS flow state indication information is used for indicating the state of the QoS flow corresponding to the data radio bearer maintained by the UE, and instructing the UE to process the QoS flow according to the state of the QoS flow. Specifically, the QoS flow state indication information is used for indicating the UE whether the state of the corresponding QoS flow is an active state or a suspended state. The QoS flow state indication information can be a bit value.

At the same time, prior to this, the network-side network element configures the radio resources for the data radio bearer corresponding to the QoS flow indicated as the active state.

It is to be noted that, each of the above modules may be realized by software or hardware. For the latter, the each of the above modules may be realized by, but not limited to, the following way: all of the above modules are in the same processor; or, the above modules are respectively in different processors in form of any combination.

Embodiment Five

An embodiment of the application also provides a storage medium. The storage medium stores a computer program.

When configured to run, the computer program performs the method in any of the above embodiments.

In an embodiment, in the present embodiment, the storage medium may be set to store a computer program for performing the following steps.

At S1, indication information is sent to the network-side network element, the indication information being used for indicating the first data radio bearer in the data radio bearers maintained by the UE, and the first data radio bearer being a data radio bearer needing to send uplink data.

At S2, the configuration information returned by the network-side network element according to the indication information is received.

At S3 the first data radio bearer is resumed according to the configuration information.

In an embodiment, the storage medium is also set to store a computer program for performing the following steps.

At S1, indication information sent by the UE is received, the indication information being used for indicating the first data radio bearer in the data radio bearers maintained by the UE, and the first data radio bearer being a data radio bearer needing to send uplink data.

At S2, the configuration information is returned to the UE according to the indication information, the configuration information being used for instructing the UE to resume the first data radio bearer according to the configuration information.

Optionally, in the present embodiment, the storage media may include, but is not limited to, a USB flash disk, an ROM, an RAM, a mobile hard disk, a magnetic disk, a compact disc, and other media capable of storing the computer program.

Embodiment Six

An embodiment of the present disclosure also provides an electronic device, which includes a memory and a processor. The memory stores a computer program. The processor is configured to run the computer program, so as to perform the method in any of the above embodiments.

In an embodiment, the electronic device may also include a transmission device and an input/output device. The transmission device is connected with the processor, and the input/output device is connected with the processor.

Optionally, in the present embodiment, the processor may be configured to perform the following steps through the computer program.

At S1, indication information is sent to the network-side network element, the indication information being used for indicating the first data radio bearer in the data radio bearers maintained by the UE, and the first data radio bearer being a data radio bearer needing to send uplink data.

At S2, the configuration information returned by the network-side network element according to the indication information is received.

At S3, the first data radio bearer is resumed according to the configuration information.

In an embodiment, the processor is also set to perform the following steps through the computer program.

At S1, indication information sent by the UE is received, the indication information being used for indicating the first data radio bearer in the data radio bearers maintained by the UE, and the first data radio bearer being a data radio bearer needing to send uplink data.

At S2, the configuration information is returned to the UE according to the indication information, the configuration information being used for instructing the UE to resume the first data radio bearer according to the configuration information.

In an exemplary embodiment, the specific examples in the present embodiment may refer to the examples described in the above embodiments and alternative embodiments.

It is apparent that those skilled in the art should appreciate that the above modules and steps of the present disclosure may be implemented by a general-purpose computing device, and they may be centralized in a single computing device or distributed on a network composed of multiple computing devices; optionally, they may be implemented by a program code which is capable of being executed by the computing device, so that they may be stored in a storage device and executed by the computing device; and in some situations, the presented or described steps may be executed in an order different from that described here; or they are made into integrated circuit modules, respectively; or multiple modules and steps of them are made into a single integrated circuit module to realize. Therefore, the application is not limited to any particular combination of hardware and software.

The above are only the embodiments of the present disclosure and are not intended to limit the present disclosure; for those skilled in the art, the present disclosure may have various modifications and changes. Any modifications, equivalent replacements, improvements and the like within the principle of the application should fall within the protection scope of the claims of the disclosure.

What is claimed is:

1. A method for activating a Secondary Cell Group (SCG) SCG, comprising:
receiving, by a User Equipment (UE), a Radio Resource Control (RRC) connection reconfiguration message or a RRC connection resume message sent by a network-side network element, wherein the RRC connection reconfiguration message or RRC connection resume message includes SCG configuration information of the UE, and the SCG configuration information is used for instructing the UE to activate or not to activate a SCG;
determining, by the UE, whether to activate the SCG according to the SCG configuration information;
wherein before receiving the connection reconfiguration message or the RRC connection resume message sent by the network-side network element, the method further comprises: sending indication information to the network-side network element, the indication information being used for indicating a first data radio bearer in data radio bearers maintained by the UE, and the first data radio bearer being a data radio bearer needing to send uplink data;
wherein the indication information comprises: a first Identity (ID) for indicating a type of radio resource used by the first data radio bearer, or indicating that there is uplink data of the data radio bearer using Secondary Cell Group (SCG) resources needing to be sent;
wherein sending the indication information to the network-side network element comprises:
sending the indication information to the network-side network element through at least one of the following: an information element comprised in a Radio Resource Control (RRC) message sent to the network-side network element, and a Media Access Control Element (MAC CE) sent to the network-side network element, wherein sending the indication information to the network-side network element through the MAC CE sent to the network-side network element comprises:
redefining the MAC CE sent to the network-side network element, the redefined MAC CE being used for indicating an SCG Buffer Status Report (SCG BSR) of buffer information of logical channel group mapped in the SCG, and sending the indication information to the network-side network element through the redefined MAC CE; or,
adding information for indicating the logical channel group buffer in the into a BSR MAC CE, and sending the indication information to the network-side network element through the BSR MAC CE.

2. The method as claimed in claim 1, wherein the indication information comprises:
a second ID for indicating a relevant ID of the first data radio bearer, wherein the second ID comprises at least one of the following:
an ID of the first data radio bearer;
an ID of a logical channel corresponding to the first data radio bearer or an ID of a logical channel group corresponding to the first data radio bearer;
an ID of a Protocol Data Unit (PDU) session corresponding to the first data radio bearer; and
an ID of a Quality of Service (QoS) flow corresponding to the first data radio bearer.

3. The method as claimed in claim 1, wherein the RRC message sent to the network-side network element comprises at least one of the following:
an RRC resume request message, an RRC resume completion message and a SCG failure information message.

4. The method as claimed in claim 1, wherein activating the SCG according to the configuration information comprises:
in the case that the RRC connection reconfiguration message or the RRC connection resume message comprises the SCG configuration information of the UE, according to the SCG configuration information of the UE and local SCG configuration information saved by the UE, the UE resumes the first data radio bearer corresponding to the SCG configuration information of the UE and the first data radio bearer corresponding to the local SCG configuration information, or the UE resumes the first data radio bearer corresponding to the SCG configuration information of the UE according to the SCG configuration information of the UE, or the UE resumes the first data radio bearer corresponding to the local SCG configuration information according to the local SCG configuration information saved by the UE.

5. The method as claimed in claim 1, wherein the SCG configuration information includes an explicit indication or an implicit indication, the explicit indication is for indicating the UE whether to activate the SCG through an information element included in the RRC message, and the implicit indication is that, by an agreement, if the RRC message includes SCG configuration, the SCG is to be activated.

6. The method as claimed in claim 5, the step of activating the SCG comprises:
synchronizing to a specified Primary Cell (PCell) of the SCG through an RACH procedure, and activating an data radio bearer using the SCG resources.

7. A method for activating a Secondary Cell Group (SCG) SCG, comprising:

sending, by a network-side network element, a Radio Resource Control (RRC) connection reconfiguration message or a RRC connection resume message to a User Equipment (UE), wherein the RRC connection reconfiguration message or RRC connection resume message includes SCG configuration information of the UE, and the SCG configuration information is used for instructing the UE to activate or not to activate a SCG;
before sending the RRC connection reconfiguration message or the RRC connection resume message to the UE, the method further comprises: receiving, by the network-side network element, indication information sent by the UE, the indication information being used for indicating a first data radio bearer in data radio bearers maintained by the UE, and the first data radio bearer being a data radio bearer needing to send uplink data;
wherein the indication information comprises: a first Identity (ID) for indicating a type of radio resource used by the first data radio bearer, or indicating that there is uplink data of the data radio bearer using SCG resources needing to be sent;
wherein the indication information is sent by the UE to the network-side network element through at least one of the following: an information element comprised in a Radio Resource Control (RRC) message sent to the network-side network element, and a Media Access Control Element (MAC CE) sent to the network-side network element,
wherein sending the indication information to the network-side network element through the MAC CE sent to the network-side network element comprises:
redefining the MAC CE sent to the network-side network element, the redefined MAC CE being used for indicating an SCG Buffer Status Report (SCG BSR) of buffer information of logical channel group mapped in the SCG, and sending the indication information to the network-side network element through the redefined MAC CE; or,
adding information for indicating the logical channel group buffer in the into a BSR MAC CE, and sending the indication information to the network-side network element through the BSR MAC CE.

8. The method as claimed in claim 7, wherein the indication information comprises: a second ID for indicating a specific target of the first data radio bearer, wherein the second ID comprises at least one of the following:
an ID of the first data radio bearer;
an ID of a logical channel corresponding to the first data radio bearer or an ID of a logical channel group corresponding to the first data radio bearer;
an ID of a Protocol Data Unit (PDU) session corresponding to the first data radio bearer; and
an ID of a Quality of Service (QoS) flow corresponding to the first data radio bearer.

9. The method as claimed in claim 7, wherein sending the RRC connection reconfiguration message or the RRC connection resume message to the UE comprises:
in the case that the received indication information is sent by the UE in an RRC INACTIVE state, sending an RRC connection resume message to the UE;
in the case that the received indication information is sent by the UE in an RRC connected state, sending an RRC connection reconfiguration message to the UE.

10. The method as claimed in claim 7, wherein the SCG configuration information includes an explicit indication or an implicit indication, the explicit indication is for indicating the UE whether to activate the SCG through an information element included in the RRC message, and the implicit indication is that, by an agreement, if the RRC message includes SCG configuration, the SCG is to be activated.

11. The method as claimed in claim 10, before receiving the configuration information sent by the network-side network element, further comprising:
    determining, by the network-side network element, whether to configure resources in a Secondary Node (SN) of the UE.

12. The method as claimed in claim 11, further comprising:
    when determined to configure the resources in the SN of the UE, the network-side network element determining the SN of the UE, and instructing the SN to configure radio resources for the UE according to the SCG configuration of the UE, and carrying the SCG configuration of the UE in the RRC message to instruct the UE to activate the SCG; or
    when determined not to configure the resources in the SN of the UE, the network-side network element does not include the SCG configuration in the RRC message sent to the UE, or includes the SCG configuration, and explicitly instructs the UE not to activate the SCG.

13. A device for activating a Secondary Cell Group (SCG) SCG, allocated in a User Equipment (UE), comprising:
    a receiving module, configured to receive a Radio Resource Control (RRC) connection reconfiguration message or a RRC connection resume message sent by a network-side network element, wherein the RRC connection reconfiguration message or RRC connection resume message includes SCG configuration information of the UE, and the SCG configuration information is used for instructing the UE to activate or not to activate a SCG;
    a determination module, configured to determine whether to activate the SCG according to the SCG configuration information;
    an indicating module, configured to send, before receive the RRC connection reconfiguration message or the RRC connection resume message, indication information to a network-side network element, the indication information being used for indicating a first data radio bearer in data radio bearers maintained by the UE, and the first data radio bearer being a data radio bearer needing to send uplink data,
    wherein the indication information comprises: a first Identity (ID) for indicating a type of radio resource used by the first data radio bearer, or indicating that there is uplink data of the data radio bearer using Secondary Cell Group (SCG) resources needing to be sent,
    wherein the indication information is sent by the UE to the network-side network element through at least one of the following: an information element comprised in a Radio Resource Control (RRC) message sent to the network-side network element, and a Media Access Control Element (MAC CE) sent to the network-side network element,
    wherein the device is further configured to:
    redefine the MAC CE sent to the network-side network element, the redefined MAC CE being used for indicating an SCG Buffer Status Report (SCG BSR) of buffer information of logical channel group mapped in the SCG, and send the indication information to the network-side network element through the redefined MAC CE; or,
    add information for indicating the logical channel group buffer in the into a BSR MAC CE, and send the indication information to the network-side network element through the BSR MAC CE.

* * * * *